United States Patent [19]

Puschkarski

[11] 4,120,130
[45] Oct. 17, 1978

[54] CLAMPING DEVICE

[76] Inventor: Felix Puschkarski, Zierleitengasse 40, A-1190 Wien, Austria

[21] Appl. No.: 834,781

[22] Filed: Sep. 19, 1977

[30] Foreign Application Priority Data

Sep. 20, 1976 [DE] Fed. Rep. of Germany ....... 2642227

[51] Int. Cl.[2] .............................................. E04B 1/60
[52] U.S. Cl. ........................................ 52/285; 52/403;
52/584; 403/110; 403/231; 403/312
[58] Field of Search ................. 52/285, 584, 395, 403,
52/397, 464, 467; 403/110, 231, 312

[56] References Cited

U.S. PATENT DOCUMENTS

| 947,617 | 1/1910 | McGann | 52/464 X |
| 1,664,543 | 4/1928 | Easterman | 52/285 |
| 1,801,273 | 4/1931 | Himmel et al. | 52/285 |
| 2,103,832 | 12/1937 | Tindall | 52/285 |
| 3,158,961 | 12/1964 | Hawkins | 52/395 |
| 3,192,669 | 7/1965 | Hawkins | 52/467 X |

*Primary Examiner*—Alfred C. Perham

*Attorney, Agent, or Firm*—Burgess, Ryan and Wayne

[57] ABSTRACT

A clamping or connecting device for detachably connecting two plates disposed with respect to each other at an angle which may be selected within a large range of angles. The clamping device comprises two clamping jaws connected to each other by bolt means and forming bearing seats on opposite sides of the bolt means, the bearing seats having cylindrical inner surfaces for receiving cylindrical clamping bodies which are rotatable in their bearing seats about a respective axis approximately perpendicular to the bolt means as long as the clamping device is in an unmounted state, the clamping bodies consisting of two separate clamping elements the cross sectional area of which is in the form of a segment of a circular surface so that each clamping element has an arcuate and a plane side surface portion. The clamping elements consist of a hard material, such as metal or a hard plastic material. Plates of different thickness dimensions may be clamped or connected to each other without having to change parts of the clamping device.

16 Claims, 15 Drawing Figures

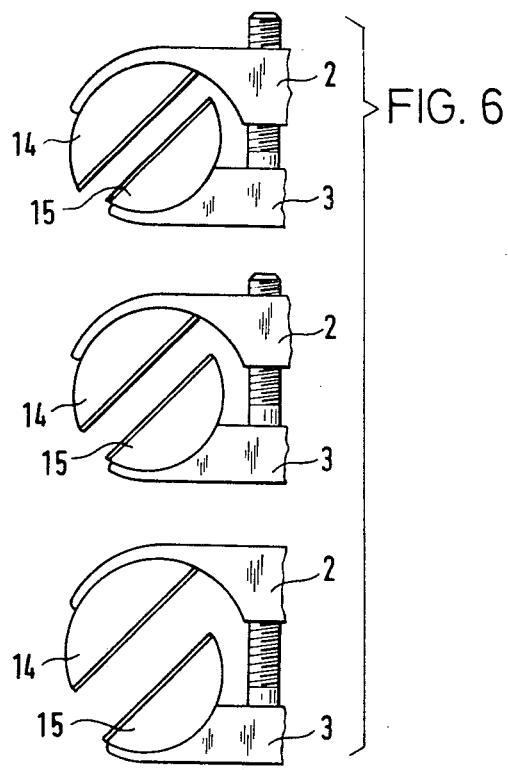
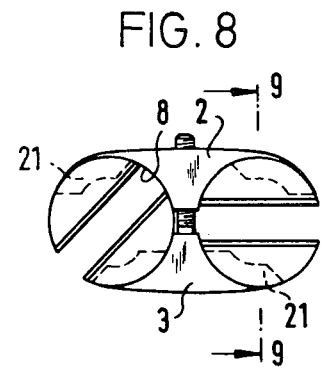
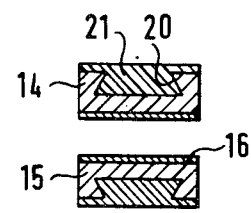
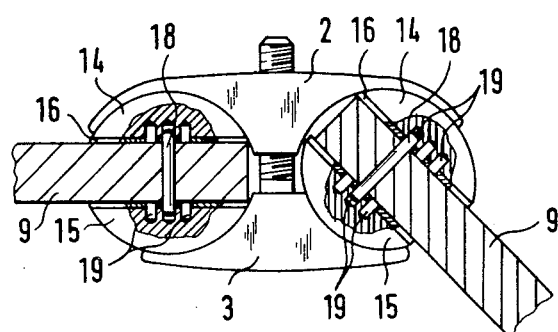
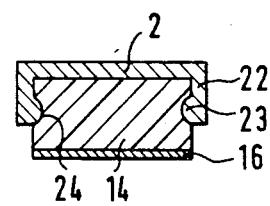
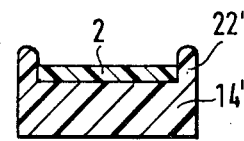

CLAMPING DEVICE

BACKGROUND OF THE INVENTION

I. Field of the Invention

This invention relates to a clamping or connecting device for detachably connecting two plates, which are positioned with respect to each other at an angle which may be selected within a large range of angles. The invention is particularly applicable to a clamping device for connecting wall plates used for constructing a stall at a fair or a display stand, but is not limited thereto.

II. Description of the Prior Art

A clamping or connecting device of the general type to which the invention relates is known from the German published application (DAS) 1,933,378. The clamping bodies of this known device are one-part, cylindrical bodies of elastomeric material, the clamping groove of such bodies having a definite, fixed width. The clamping jaws have inwardly extending side flanges which locate the clamping body which is seated between the clamping jaws, against axial displacement. The known clamping device has the deficiency that different clamping bodies, each having a clamping groove the width of which corresponds to the thickness of the particular plates to be secured, are necessary for plates of different thickness dimensions. Furthermore, the strength of the connection is limited because the clamping body is squeezed when subjected to high clamping forces. When the clamping body is squeezed, there is a tendency that the clamping force is concentrated in the middle of the side surfaces of the clamping groove, and the edge portions of the clamping surfaces of the clamping body tend to be moved away from the plates whereby the clamping force is further reduced. Furthermore, excessive clamping forces exerted by the clamping jaws tend to destroy the clamping bodies themselves.

It is, therefore, a principal object of this invention to provide an improved clamping and connecting device.

It is another object of this invention to provide an improved clamping device by means of which plates of different thickness dimensions may be connected without having to exchange single parts of the clamping device.

It is still a further object of this invention to provide an improved clamping device by which a very high strength of connection between the clamping device and the plate to be clamped is achieved.

SUMMARY OF THE INVENTION

In accordance with the present invention, a clamping device for detachably connecting two plates disposed at an angle with respect to each other is provided, the device comprising two clamping jaws connected to each other by bolt means and forming bearing seats on opposite sides of the bolt means, the bearing seats having cylindrical inner surfaces for receiving cylindrical clamping bodies which are rotatable in their bearing seats about a respective axis approximately perpendicular to the bolt means as long as the clamping device is in an unmounted state, the clamping bodies consisting of two separate clamping elements the cross sectional areas of which have the form of a segment of a circular surface so that each clamping element has an arcuate and a plane side surface portion.

In the clamping device of the invention, the "clamping groove" of each clamping body is defined by the two plane surfaces of its clamping elements. Since the clamping elements are separate parts, the width of the clamping groove may simply be adjusted by opening or closing the clamping jaws without having to change parts of the clamping device.

Since the clamping elements consist, according to a preferred embodiment, basically of a hard material, for example metal or a hard plastic material, very high clamping forces may be applied to the plates whereby a very strong connection between the clamping device and the plate is achieved. Furthermore, the clamping pressure of the clamping elements is uniformly distributed over the entire plane or clamping surfaces because the clamping elements are comprise a hard material and are unrestricted in their orientation with respect to each other prior to tightening of the clamping device. It has been found that the edge portions of the plane or clamping surfaces of the clamping elements firmly grip the plates clamped between the clamping elements. This is in contrast to the situation in the known clamping device where the clamping force tends to concentrate in the middle of the clamping surfaces of the clamping body. The improved strength of the connection between the clamping element and the clamped plate has also the advantage that the connection can withstand to a high extent forces which try to draw or pivot the clamped plate out of its proper position in the clamping device.

The clamping surface itself is comparatively large since the plate to be clamped is introduced far between the two clamping elements in the bearing seat. At maximum, the entire plane surface of each clamping element forms the clamping surface or area. Because of the hardness of the clamping elements, the high connecting strength of the clamping device is maintained also in such cases where the connected plates are positioned at angles with respect to each other which are extreme angles in the sense that the single clamping elements are seated in the bearing seats only with a comparatively small portion of the clamping elements.

In a preferred embodiment of the invention, the clamping elements consist of hard plastic material affording sufficient friction between the clamping elements and the surfaces of the clamped plates. In other words, there is a compromise with respect to the hardness of the platic material in the sense that the plastic material could be as hard as possible in order to properly transmit the clamping forces on the one hand and the plastics material should also afford also sufficient friction between the clamping elements and the surfaces of the plates, which friction increases with decreasing hardness of the plastic material. A material having the desired properties is for example polyethylene copolymer.

In order to achieve increased friction between the smooth surfaces of the plates and the clamping elements, the clamping elements may comprise a layer of elastomeric material on their plane surfaces according to another embodiment of the invention. The rest of the clamping elements may consist of hard plastic material or metal. The thickness of the layers of elastomeric material is selected such that there is no substantial lateral squeezing effect of such layers.

In another embodiment of the invention, the handling of the clamping device is facilitated if the clamping elements of each clamping body are held in engagement with the inside surfaces of the corresponding bearing seat. Since each clamping element of each clamping body is held in engagement with the interior surface of the respective bearing seat by a form-locking shape or by means of the initial tension of resilient means, all parts of the clamping device form in their entirety a unit ready for use which is supplied to the user in a fully assembled state. The clamping device of the invention may, therefore, be used repeatedly without the risk of losing single parts of the clamping device.

In order to achieve the form-locking mounting of the clamping elements on the interior surfaces of the bearing seats, an undercut or dovetail annular groove is particularly suitable, which groove is for example provided on the respective clamping body and cooperates with a corresponding annular land on the inside surface of the bearing seat. Such a form-locking mounting assures also that the clamping elements are held against axial displacement.

A further embodiment of the clamping device may be produced more easily if the clamping body is mounted taking advantage of the initial tension of resilient means. In this respect, an additional mounting support against axial displacement of the clamping body or the clamping elements thereof is preferred, which mounting support may be achieved by means of lateral flanges on the clamping jaws or on the clamping elements which flanges grip the clamping elements or the clamping jaws respectively.

A preferred embodiment of the resilient means providing the initial tension to the clamping elements is a one-piece arrangement of the material strips and the layers on the clamping elements whereby the manufacture of the clamping device is rendered particularly simple. The strip of resilient material or the strips of resilient material which connect the two clamping elements of the clamping body and which are located on the inside of the respective bearing seat try to move the two clamping elements away from each other and, thereby, press these elements onto the inside surfaces of the bearing seat. The length of the material strips is selected such that the two clamping elements may be positioned at a distance from each other corresponding to the largest plate thickness.

The clamping device of the invention may be further improved in order to make the clamping surface of the clamping elements as large as possible in spite of the material strips. In this embodiment, the breadth of the material strip is essentially smaller than the height of the clamping element, and the clamping elements comprise a groove-like recess next to each material strip in order to take up the respective material strip at least in part. The material strips are taken up in the groove-like recesses in this embodiment when the clamping elements come closer to each other, for example when thin plates are clamped in the clamping device.

The fact that the clamping device of the invention comprises a clamping body of hard clamping elements makes it possible to additionally secure the plates held between the clamping elements by providing securing pins which extend into bores in the clamping elements. A plurality of bores are spaced from each other in a direction transverse to the axis of the cylinder of the clamping body, because the clamping elements of a particular clamping body are displaced with their plane surfaces parallel to each other depending on the angular position of the clamping body in the bearing seat. If a plurality of bores is provided, there is always a pair of bores aligned with each other inspite of the above mentioned displacement. A securing pin may be introduced into such pair of bores which pin extends through the plate. Since it is possible to use such a securing pin, a firm connection may be made also in such cases where vibrations or other repeatedly occuring movements, for example movements caused by wind, are expected to occur which influences could cause a gradual loosening of the connection. This embodiment of the invention renders it possible for the first time to build up the plate structures also in open air with the necessary security and stability. Furthermore, the construction of dome-shaped arrangements and geodetic domes as proposed by Buckminster-Fuller, is possible.

In a further preferred embodiment, the inside surfaces of the bearing seat and the arcuate surfaces of the clamping elements are roughened, a particularly advantageous roughening being obtained by providing axial serrations on the arcuate surfaces of the clamping elements and/or the inside surfaces of the bearing seat. This provides additional security against the tendency of the clamping elements to turn within the bearing seat.

In general, each clamping body will be assembled out of two clamping elements having the same cross section of a segment of a cylinder. It is an advantage of the clamping device of the invention that this is not necessarily so. In particular cases, clamping elements having different radii of curvature and different segment heights, i.e. a different height of the segment cross section, may be used whereby one has to look for corresponding radii of curvature of the clamping element and the inside surface of the bearing seat on which the clamping element is seated. If, according to a preferred embodiment of the clamping device the two clamping elements of a particular clamping body have chords of different length an improved clamping action is achieved when the interconnected plates are positioned at extreme angles to each other. This is true when the clamping element having the shorter length of chord is correlated to the smaller inside surface of the bearing seat, and the other clamping element is correlated to the larger inside surface of the bearing seat.

A preferred embodiment for the bolt means is a screw threaded bolt and nut arrangement. In this preferred embodiment, it is advantageous when at least one clamping jaw comprises a through-hole for the screw threaded bolt, the through-hole flaring conically to the inside of the clamping jaw. This embodiment has the advantage that two plates having different thickness dimensions may be particularly well connected to each other by one and the same clamping device. The conical shape of the through-hole renders it possible to position the two clamping jaws in an asymmetrical way with respect to each other such that the one bearing seat is larger than the other bearing seat. Thereby, the clamping elements in the larger bearing seat are spaced apart by a longer distance as compared with the clamping elements of the other bearing seat.

Other than the above stated objects, features and advantages of the present invention will become apparent from the subsequent description and the appended claims taken in conjunction with the accompanying drawings.

BRIEF DESCRIPTION OF THE DRAWINGS

The foregoing objects and others will in part be obvious and in part pointed out more fully herein after in conjunction with the description of the preferred embodiments of the present invention illustrated in the accompanying drawings and in which:

FIG. 6 shows three plan views corresponding to the plan view of FIG. 3 of a clamping device in three positions corresponding to three different plate thicknesses;

FIG. 7 is a plan view of another clamping device;

FIG. 8 is a plan view of a further embodiment of the clamping device;

FIG. 9 is a section along the line 9—9 in FIG. 8;

FIG. 10 A is a section like FIG. 9 of a modified embodiment;

FIG. 10 B is a section like FIG. 9 of a modified embodiment;

DESCRIPTION OF THE PREFERRED EMBODIMENT

Figure 1:
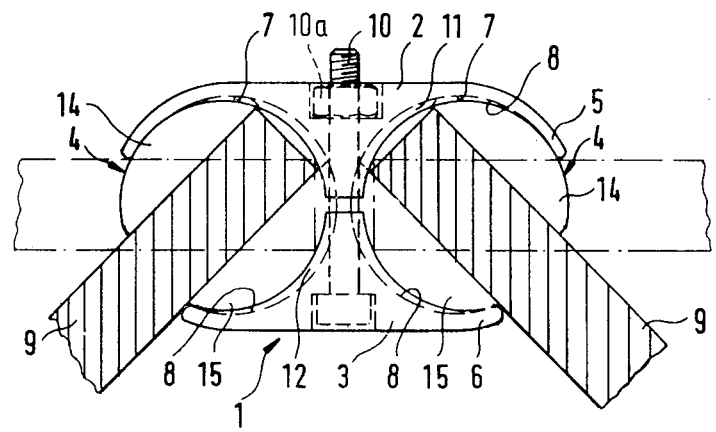
FIG. 1 is a plan view of the clamping device of the invention in use.

FIG. 1 shows the clamping device 1 comprising two clamping jaws 2 and 3 of different size as well as two similar clamping bodies 4. The one clamping jaw 2 has long lateral extensions 5, and the other clamping jaw 3 has comparatively shorter extensions 6. Two bearing seats 7 having cylindrical inside surfaces 8 are formed between the lateral extensions 5,6 of the two clamping jaws. The inside surfaces 8 of the bearing seats are cylindrical in the sense that the inside surfaces 8 define circular arcs in a cross section parallel to the plane of the paper in FIG. 1, and they define straight lines in cross sections perpendicular to the plane of the paper of FIG. 1. The clamping body 4 is accomodated in the bearing seats. A wall plate 9 is gripped in each clamping body 4, the angular position of which plate is adjustable by rotating the cylindrical clamping body within its bearing seat 7 about the cylinder axis within the limits defined by the lateral extensions 5 and 6. Of course, rotating the cylindrical clamping body is only possible when the clamping jaws 2,3 are not tightened. The size or length of the lateral extensions is selected such that the angle between two respective plates 9 may be varied between 90° and 120°, see the position of the plates 9 shown in FIG. 1 in full lines and the position of the plates shown in FIG. 1 in broken lines. A threaded bolt 10 extends through the two clamping jaws 2 and 3 in the middle between the bearing seats 7, the bolt 10 extending perpendicular to the cylinder axis of the two clamping bodies 4. The two clamping jaws 2 and 3 may be drawn together or tightened by means of a nut 10a which is screwed on the bolt 10. By tightening the nut 10a, the clamping elements 14,15 are pressed against the plates 9. Radial flanges 11 and 12 extending to the inside and getting narrower as they approach the ends of the extensions, are formed on the extensions 5 and 6. The flanges 11 and 12 overlap the clamping bodies 4 and locate the clamping bodies against axial displacement.

Each clamping body 4 comprises two separate clamping elements 14 and 15 having the cross sectional area of segments of a circular area. In other words, the clamping elements 14 and 15 are portions of an upright cylindrical body, which portions have a base surface in the form of a segment of circular surface. The two clamping elements of a clamping body are disposed on the two sides of a plate 9 to be clamped between them, and the clamping elements form an axial "clamping groove" for the plate between their plane side surfaces. The clamping elements 14 and 15 consist of a hard material, for example out of a hard plastics material. If the clamping elements consist of hard plastics material, it is possible to select such material so that it also affords sufficient friction between the clamping elements 14, 15 and the surfaces of the plates 9. If the clamping elements 14 and 15 consist substantially out of hard plastics material which affords not sufficient friction with the surfaces of the plates 9 or if the clamping elements 14, 15 are substantially made out of metal, the necessary friction can be afforded by a thin layer 16, see for example FIG. 4, which layer 16 consists of an elastomeric material, for example rubber, and is provided on the plane side surfaces of the clamping elements.

When mounting the clamping device 1, the nut 10a of the threaded bolt 10 is loosened far enough so that the width of the clamping groove between the clamping elements 14 and 15 is somewhat larger than the thickness of the plate 9 to be clamped. Thereafter, the plates 9 are inserted between the two clamping elements 14 and 15 as far as possible until they come into abutment with the inside surface 8 of the bearing seat 7. The clamping device 1 is tightened by tightening the nut 10a on the bolt 10 until the plate 9 is firmly held between the clamping elements 14 and 15.

Figure 2:
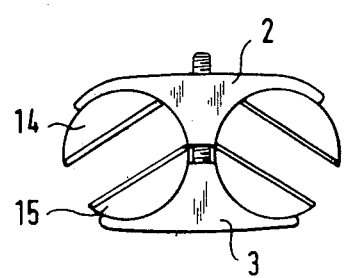
FIGS. 2 and 3 are simplified plan views each of two modified embodiments of the clamping device of FIG. 1.
Figure 3:
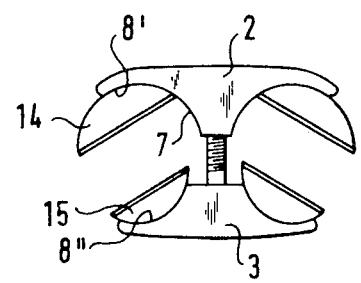

FIGS. 2 and 3 show in schematic drawings of the clamping device that the clamping elements 14 and 15 of a clamping body may have the same size and form, see FIG. 2 or may have different base surfaces, see FIG. 3. In the embodiment of FIG. 3, the larger inside surface 8' of each bearing seat 7 on the longer clamping jaw 2 has also a larger radius of curvature as compared with the smaller inside surface 8" on the shorter clamping jaw 3. The two clamping elements 14 and 15 accordingly have also different radii of curvature. The clamping element 14 is arranged in the larger inside surface 8', and the clamping element 15 in the smaller inside surface 8" of the bearing seat. Furthermore, the clamping element 14 has a longer chord than the clamping element 15. The base surface of the clamping elements is in each case defined by an arc of a circle and the chord connecting the ends of the arc.

Figure 4:
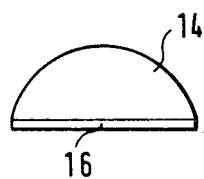
FIGS. 4 and 5 are plan views of a clamping element with a layer of elastomeric material being affixed in two different ways.
Figure 5:
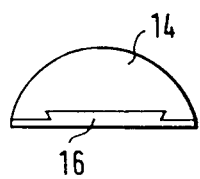

The layer 16 out of elastomeric material is preferably glued to the clamping element, see FIG. 4. Alternatively, also a form-locking mounting is possible, see FIG. 5.

One and the same clamping device is adapted to be mounted on plates of different thickness without having to interchange its clamping bodies or its clamping elements respectively. This is because the width of the clamping groove between the clamping elements may be varied by a corresponding adjustment of the nut 10a (not shown) on the bolt 10. FIG. 7 shows the clamping jaws 2, 3 in three different positions with respect to each other whereby plates of three different thickness dimensions may be — connected by one and the same clamping device. The clamping body 4 of FIG. 6 comprises two clamping elements 14 and 15 of different size, as is also shown in FIG. 3.

The plates 9 may be anchored in the clamping device 1 additionally by means of a securing pin 18 which is inserted through the plate 9 so that its ends protrude on both sides of the plate. The ends of the pin 18 extend into bores 19 in the clamping elements 14 and 15. Three bores are provided for this purpose in each clamping element 14 and 15 which bores are open to the plane side surfaces of the clamping elements and extend through the layer 16. The bores are equally spaced with respect to each other in a direction transverse to the cylinder axis of the clamping body. Depending on the angular position of the clamping body and thereby depending on the angular position of the plate 9 in the clamping device 1, different bores in the two clamping elements 14 and 15 are aligned with each other. The pin 18 may then be taken up in such aligned bores. Two different positions of the clamping body consisting of the clamping elements 14, 15 are shown in FIG. 7.

In order to support the clamping elements 14 and 15 of each clamping body in engagement with the inside surfaces of the respective bearing seats also in the unmounted stated of the clamping device, a form-locking support may be provided for the clamping elements, which supporting arrangement should, however, enable a movement of the clamping elements with respect to the clamping jaws in the sense of a rotation of the clamping body about its cylinder axis. Undercut or dovetail annular grooves 20 are provided for this purpose on the curved side surfaces of the clamping elements, see FIGS. 9 and 10. The grooves 20 engage with annular lands 21 of corresponding cross section on the inside surfaces 8 of the bearing seat. In the embodiment according to FIG. 10A, flanges 22 are provided on the clamping jaws which flanges overlap the clamping element and engage, by means of a land 23, with annular grooves 24 on the axial front surfaces of the clamping elements, FIG. 10B shows an alternative embodiment to FIG. 10A. In FIG. 10B, the clamping element 14' has flanges 22' which locate the clamping element 14' with respect to clamping jaw 2, i.e. the clamping element 14' may not move sideways as seen in FIG. 10B with respect to clamping jaw 2.

Figure 11:
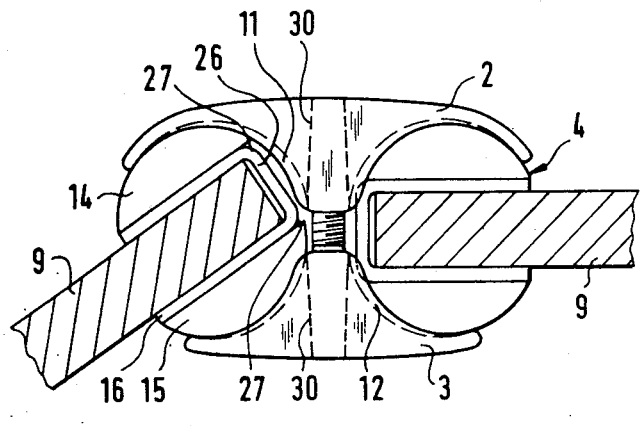
FIG. 11 is a plan view of a further embodiment of the clamping device.
Figure 12:
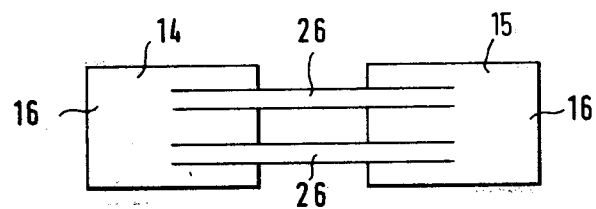
FIG. 12 is a bottom view of two clamping elements of the clamping device of FIG. 11.
Figure 13:
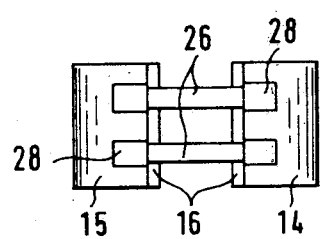
FIG. 13 is a view of the two clamping elements of FIG. 12 in assembling position.

A further embodiment of the clamping device of the invention is shown in FIGS. 11 to 13. The clamping elements of the clamping body are kept in engagement with the inside surfaces of the corresponding bearing seat by means of a resilient initial tension acting between them. In this embodiment, the two clamping elements 14 and 15 of each clamping body are connected with each other by means of two resilient material strips which strips are unitary with the layers 16 of the two clamping bodies. The two strips 26 extend between two adjacent axial edges 27 of the two clamping elements inside of the clamping device. Both strips extend parallel to each other, are spaced apart from each other and have a breadth which is essentially smaller than the height of the clamping element, see FIGS. 12 and 13. The length of the strips between the edges 27 is selected according to the largest possible plate thickness.

FIG. 12 shows the two clamping elements of a clamping body when looking at the layers 16 in a position which they tend to take under the resilient initial tension of the strips 26 and in which the strips and the layers 16 lay somewhat in a plane. In order not to bend the strips at the edges 27 too much in the assembled state, the material strips are prolonged by means of parallel cuts in the layers approximately up to the middle of the two clamping elements. By means of such cuts the strips form separate elements from the layers 16 and are movable with respect to such layers up to the middle of the two clamping elements. About in the middle of the two clamping elements the strips merge at their front ends with the layers. Between its center and the axial edge 27, each clamping element comprises a groove-like recess 28 beneath each material strip 26, see FIG. 13, in which recess the material strip may be moved in such cases where the plate thickness is small and the "clamping groove" between the clamping elements is, consequently, also narrow. FIG. 13 shows the two clamping elements from the rear in such a position in which they are located between the clamping jaws 2 and 3 as is shown in FIG. 11. The clamping elements are held in this assembled position by the resilient initial tension of the material strips 26.

In the embodiment of FIG. 11 a through-hole 30 for the threaded bolt 10 is shown in each of the clamping jaws 2, 3 which through-hole 30 flares conically to the inside of the clamping device in the sense that the end of the hole 30 having the larger diameter is inside the clamping jaw. Thereby the two clamping jaws 2 and 3 may also be tightened in positions where the general longitudinal direction of the extensions 5 of the one clamping jaw is disposed at an angle with respect to the general longitudinal direction of the extensions 6 of the other clamping jaw 3. This means that the clamping elements 14, 15 in the bearing seat 7 on one side of the bolt are closer to each other to clamp a thinner plate 9 in this clamping body as compared to the plate which is clamped in the clamping body on the other side of the bolt 10. In this arrangement, two plates of different thickness dimensions may, therefore, be connected by the clamping device of this embodiment of the invention.

Figure 14:
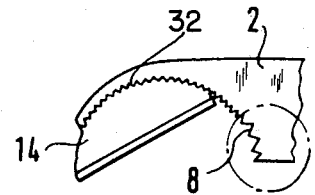
FIG. 14 is a view of a clamping jaw of the clamping device and the corresponding clamping element having axial serrations.

The curved outer surfaces of the clamping elements 14 and 15 and/or the inside surfaces 8 of the bearing seats 7 may be provided with axial serrations 32, see FIG. 14, in all embodiments. This roughening of the surfaces serves as a further means to prevent the clamping body from an unintended rotation about its cylinder axis, for example when forces are exerted on a plate 9 which tend to cause such a rotation.

The clamping jaws described above may be of hard plastic material as well as of metal, for example aluminum or an aluminum alloy. If the material of the clamping jaws 2, 3 is somewhat harder than the material of the clamping elements 14, 15, it will be sufficient to provide the axial serrations 32 shown in FIG. 14 on the clamping jaws 2, 3 only. However, if the clamping jaws as well as the clamping elements are a metallic material, it is preferred to provide the serrations on both the clamping jaws and the clamping elements.

While it will be apparent that the preferred embodiments of the invention disclosed are well calculated to fulfil the objects above stated, it will be appreciated that the invention is susceptible to modification, variation and change without departing from the proper scope of their meaning of the subjoined claims.

What is claimed is:

1. A clamping device for detachably connecting two plates disposed at an angle with respect to each other, the device comprising two clamping jaws connected to each other by bolt means and forming bearing seats on opposite sides of the bolt means, the bearing seats having cylindrical inner surfaces, cylindrical bodies disposed and rotatable in each of said bearing seats about an axis approximately perpendicular to the bolt means as long as the clamping device is in an unmounted state, each of said clamping bodies consisting of a separate clamping element the cross sectional area of which has the form of a segment of a circular surface so that each clamping element has an arcuate and a plane side surface portion.

2. The device of claim 1, wherein the clamping elements consist of plastic material which is substantially hard and provides sufficient friction between the clamping elements and the surfaces of the plates to retain the same in mutual engagement.

3. The device of claim 1, wherein the clamping elements comprise substantially hard material and have layers of elastomeric material on the plane surfaces thereof.

4. The device of claim 1, further comprising means for holding the clamping elements of each clamping body in engagement with the inside surfaces of the corresponding bearing seat.

5. The device of claim 4, wherein the clamping elements are held by a form-locking arrangement in engagement with the inside surfaces of the bearing seats.

6. The device of claim 5, wherein a dovetail joint comprising an undercut annular groove and a corresponding land is provided.

7. The device of claim 4, wherein the two clamping elements of a clamping body are held in engagement with the inside surfaces of the bearing seat by the initial tension of resilient means acting between the clamping elements.

8. The device of claim 7, wherein the two clamping elements are connected to each other by means of at least one strip of resilient material which strip extends between the adjacent axial edges of the clamping elements.

9. The device of claim 8, wherein the material strip and the layers of elastomeric material on the plane surfaces of the two clamping elements of a clamping body are formed in one piece.

10. The device of claim 8, wherein the breadth of the material strip is substantially smaller than the height of the clamping element, and the clamping elements each have a groove-like recess adjacent each material strip for receiving at least a part thereof.

11. The device of claim 1, wherein each clamping element comprises a plurality of bores opening to the plane side surfaces of the clamping elements and being displaced with respect to each other transversely to the cylinder axis, said bores being adapted to receive a securing pin extending through the plate to be clamped.

12. The device of claim 1, wherein the inside surfaces of the bearing seats and/or the arcuate surfaces of the clamping elements are roughened.

13. The device of claim 12, wherein the inside surfaces of the bearing seats and/or the arcuate surfaces of the clamping elements are provided with axial serrations.

14. The device of claim 1, wherein the two clamping elements of a particular clamping body have chords of different length.

15. The device of claim 1, wherein the bolt means comprises a threaded bolt and a nut screwed on said bolt.

16. The device of claim 15, wherein at least one clamping jaw has a through-hole for the threaded bolt, the through-hole flaring conically to the inside of the respective clamping jaw.

* * * * *